P. K. DEDERICK.
BALING-PRESS.

No. 170,999. Patented Dec. 14, 1875.

WITNESSES
Grenville Lewis.
F. M. Kenny

INVENTOR
Peter K. Dederick
Hill & Ellsworth
By His Attorneys

UNITED STATES PATENT OFFICE.

PETER K. DEDERICK, OF ALBANY, NEW YORK.

IMPROVEMENT IN BALING-PRESSES.

Specification forming part of Letters Patent No. 170,999, dated December 14, 1875; application filed September 1, 1875.

*To all whom it may concern:*

Be it known that I, PETER K. DEDERICK, of the city and county of Albany, in the State of New York, have invented certain new and useful Improvements in Baling-Presses; and I do hereby declare the following to be a full, clear, and exact description of the same, reference being had to the accompanying drawings, forming part of this specification, in which—

Figure 1:
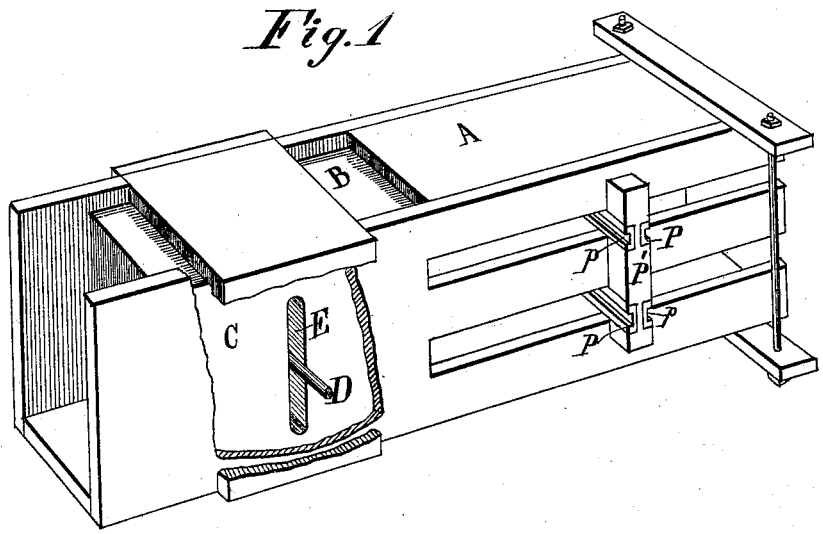
Figure 2:
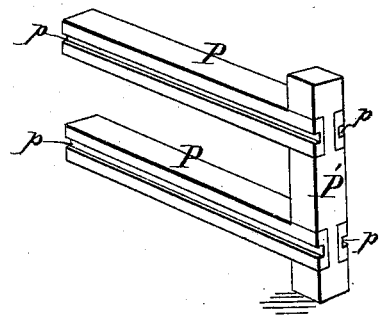

Figure 1 is a perspective view of a press, showing the application of my partition-strips; and Fig. 2 is a perspective view of the partition-strips detached.

Similar letters of reference in the accompanying drawings denote the same parts.

This invention has for its object to improve the construction of that class of baling-presses which operate continuously; and consists in providing partition-strips, to be inserted between the bales through the longitudinal slots in the sides of the press-box, said strips having one or more longitudinal slots or grooves for the passage of the tie wires or bands, as hereinafter more fully described.

In the drawings, A represents the frame of a horizontal continuous press; B, the aperture through which the material to be baled is fed to the pressing-chamber; and C, the solid traverser, operated by a crank-shaft, D, which plays within a transverse slot, E, as shown in Fig. 1. P P are the partition-strips, constructed with one or more longitudinal grooves, $p$, for the passage of the tie-wires.

Each strip may be separate, or two or more may be united by a cross-piece, P', as preferred.

The press being set in operation, the material to be baled is fed through the aperture B, and the bale gradually formed in the press-box. When the bale is sufficiently large, the partition-strips P P are passed through the longitudinal slots in the press-box behind the bale, and a new bale formed against them. The tie-wires can then be easily passed through the grooves $p\ p$, and the bale secured.

The grooves in the strips may be one or more in number, and located on top and bottom or sides thereof.

I claim as my invention—

Partition-strips for baling-presses, constructed with one or more longitudinal grooves for the passage of the tie-wires, and adapted to be inserted between the bales through the longitudinal slots in the sides of the press-box, substantially as described.

PETER K. DEDERICK.

Witnesses:
A. M. DEDERICK,
W. A. SKINKLE.